United States Patent [19]

Enomoto

[11] Patent Number: 5,655,157
[45] Date of Patent: Aug. 5, 1997

[54] PARAMETER SELECTION APPARATUS FOR A BLUR CORRECTING APPARATUS OF A CAMERA

[75] Inventor: Shigeo Enomoto, Tokyo, Japan

[73] Assignee: Asahi Kogaku Kogyo Kabushiki Kaisha, Tokyo, Japan

[21] Appl. No.: 695,534

[22] Filed: Aug. 12, 1996

Related U.S. Application Data

[63] Continuation of Ser. No. 313,584, Sep. 27, 1994, abandoned.

[30] Foreign Application Priority Data

Sep. 28, 1993 [JP] Japan .................................. 5-241469

[51] Int. Cl.⁶ .................................................. G03B 39/00
[52] U.S. Cl. .................................................. 396/55
[58] Field of Search ........................ 348/207; 354/195.12, 354/70, 202, 400, 430

[56] References Cited

U.S. PATENT DOCUMENTS

| | | |
|---|---|---|
| 4,996,545 | 2/1991 | Enomoto et al. . |
| 5,039,211 | 8/1991 | Maruyama . |
| 5,150,150 | 9/1992 | Enomoto . |
| 5,280,387 | 1/1994 | Maruyama . |
| 5,305,040 | 4/1994 | Enomoto . |
| 5,337,098 | 8/1994 | Imafuji .................................. 354/70 |
| 5,365,304 | 11/1994 | Hamada et al. .................... 354/430 |
| 5,416,558 | 5/1995 | Katayama et al. .................. 354/446 |
| 5,539,496 | 7/1996 | Wakabayashi et al. ............ 354/430 |
| 5,541,693 | 7/1996 | Enomoto ............................. 354/202 |

FOREIGN PATENT DOCUMENTS

| | | |
|---|---|---|
| 62-44707 | 2/1987 | Japan . |
| 63-158518 | 7/1988 | Japan . |
| 2157732 | 6/1990 | Japan . |
| 6-35022 | 2/1994 | Japan . |

*Primary Examiner*—Safet Metjahic
*Assistant Examiner*—Daniel Chapik
*Attorney, Agent, or Firm*—Greenblum & Bernstein P.L.C.

[57] ABSTRACT

A blur correcting apparatus of a camera having a photographing optical system. A blur correcting optical system is coaxially provided in an optical axis of a photographing optical system and is supported in a manner such that the blur correcting optical system is movable in a plane normal to the optical axis. The blur correcting optical system is moved in a controlled manner with respect to the photographing optical system. The movement start time and the movement finish time of the moving of the blur correcting optical system are alterable.

12 Claims, 6 Drawing Sheets

PARAMETER SELECTION APPARATUS FOR A BLUR CORRECTING APPARATUS OF A CAMERA

This application is a continuation of application Ser. No. 08/313,584, filed Sep. 27, 1994, now abandoned.

BACKGROUND OF THE INVENTION

1. Field of the Invention

The present invention is directed to a blur correcting apparatus used for cameras which prevents an image on a film plane from blurring due to a displacement of an optical axis of a photographing optical system of a camera, caused, for example, by camera shakes.

2. Description of Related Art

When a picture is taken by a camera, particularly, when the camera is hand held without using a tripod, an accidental movement of the optical axis of the photographing optical system of the camera tends to occur due to camera shakes. These are caused particularly when the camera is not held stably by the photographer, a picture of a dark object is taken at a slow shutter speed, or the photographer takes a picture while moving, etc. The blurred picture is not clearly seen due to a streaked image. The blur caused by the camera shake can be eliminated to some extent, using a hardware solution of a bright lens or increasing the film sensitivity to increase the shutter speed, or by a software solution of improving the photographer's skill.

A blur correcting apparatus which can prevent the occurrence of blurring due to camera shake has been proposed, in which an angular velocity or the acceleration of the camera is detected and the blur correcting lens is moved in an opposite direction to the direction of the camera shake to prevent a movement of the image on the film plane.

When a blur correcting apparatus of this type is adopted for a still camera, the occurrence of blurring can be prevented only if the apparatus functions during the exposure of the camera. However, in the case of an SLR camera, if the apparatus functions only during the exposure, a photographer cannot tell, through the use of the viewfinder of the camera, whether the apparatus is properly functioning since the photographer cannot see through the view finder during the exposure due to a blackout of the finder view, which is peculiar to SLR cameras. For this reason, in photography using a SLR camera, some photographers cannot rely on the blur correcting apparatus since they cannot visually make sure if the apparatus is in operation while taking a picture.

SUMMARY OF THE INVENTION

It is an object of the present invention to provide a blur correcting apparatus of a camera which makes it possible for a photographer to visually checked wheather a blur correcting apparatus is in operation, even when the camera is an SLR camera.

To achieve the object mentioned above, according to the present invention, there is provided a blur correcting apparatus of a camera which includes a photographing optical system, wherein the blur correcting optical system is coaxially provided in an optical axis of the photographing optical system and is supported in a manner such that the blur correcting optical system is movable in a plane normal to the optical axis. The blur correcting optical system with respect to the photographing optical system uses motors and a controlling mechanism to move the blur correcting optical system in a manner such that an object image formed on a focal plane by the photographing optical system is stationary with respect to the focal plane. There is further provided a mechanism for altering the start time and the finish time of the moving of the blur correcting optical system.

According to the present invention, there is further provided a release button on a body of the camera, a photometering switch which is associated with the release button and is turned ON when the release button is depressed half way, and a releasing switch which is associated with the release button and is turned ON when the release button is fully depressed. The controlling mechanism further provides a plurality of control parameters which include first, second, and third control parameters, wherein the first control parameter of the controlling means has a start time at which a releasing switch is turned ON, and a finish time at which the shutter stops moving. The second control parameter of the controlling mechanism has a start time at which the photometering switch is turned ON, and a finish time at which the shutter stops moving. The third control parameter of the controlling mechanism has a start time at which the releasing switch is turned ON, and a finish time at which the photometering switch is turned OFF.

According to another aspect of the present invention, there is provided a blur correcting apparatus for an SLR camera having a focal plane shutter, in which a plurality of control parameters includes first, second, and third control parameters, wherein the first control parameter of the controlling mechanism has a start time at which a releasing switch is turned ON, and a finish time at which a trailing curtain of the focal plane shutter closes a photographing aperture. The second control parameter of the controlling mechanism has a start time at which the photometering switch is turned ON, and a finish time at which a trailing curtain of the focal plane shutter closes the photographing aperture. The and the third control parameter of the controlling mechanism has a start time at which the releasing switch is turned ON, and a finish time at which the photometering switch is turned OFF.

The present disclosure relates to subject matter contained in Japanese patent application No. 05-241469 (filed on Sep. 28, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 2:
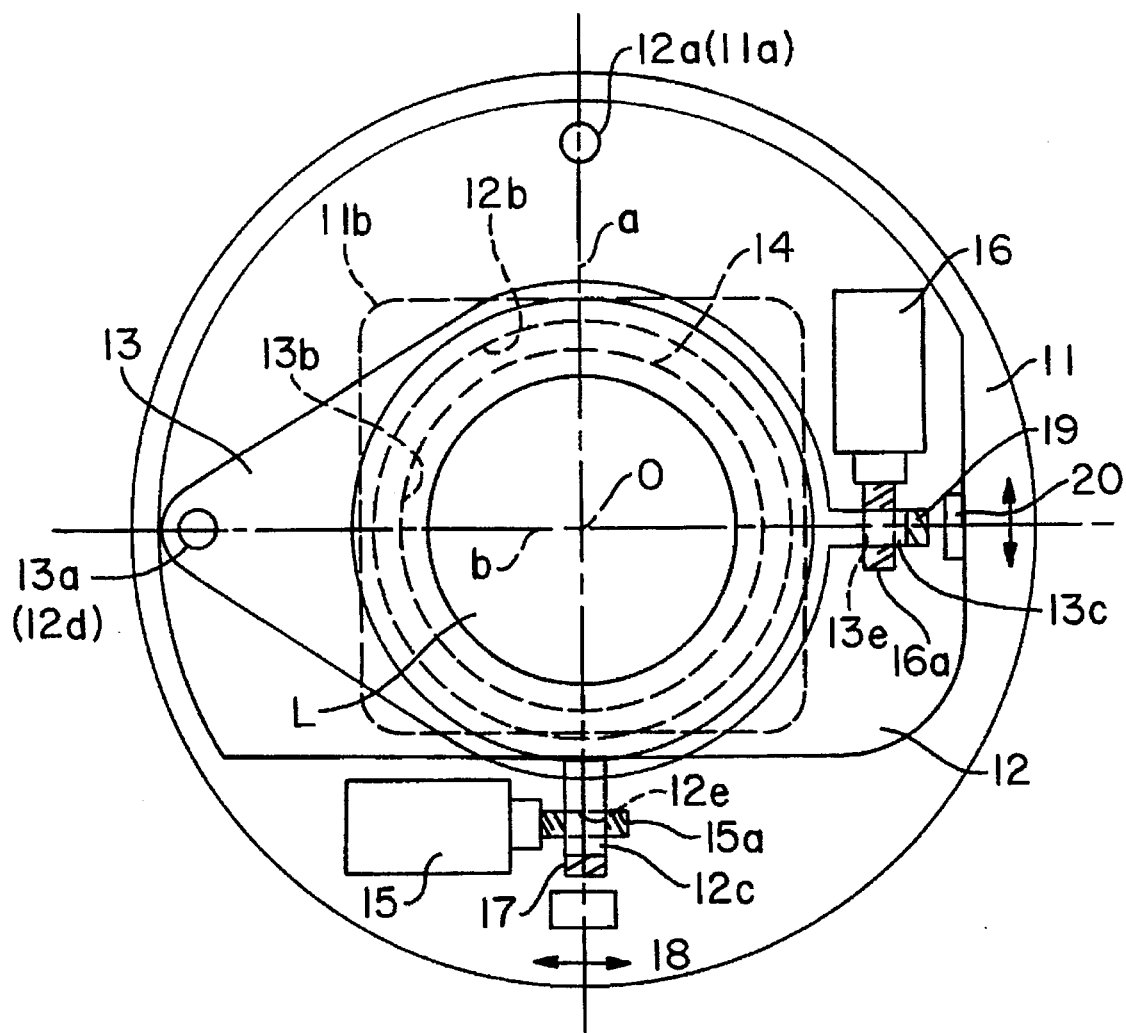
FIG. 2 is a front elevational view of a blur correcting lens driving apparatus of the blur correcting apparatus.

FIG. 2 shows a blur correcting lens driving apparatus provided in a blur correcting apparatus to which the present invention is applied. The blur correcting lens driving apparatus is provided in a camera 10 (FIG. 5) between a picture taking lens 31 which is detachably attached to the camera 10 and a film or an image pickup element (not shown) which is located at an image forming position at which an image of an object to be taken is formed by the picture taking lens 31.

Figure 3:
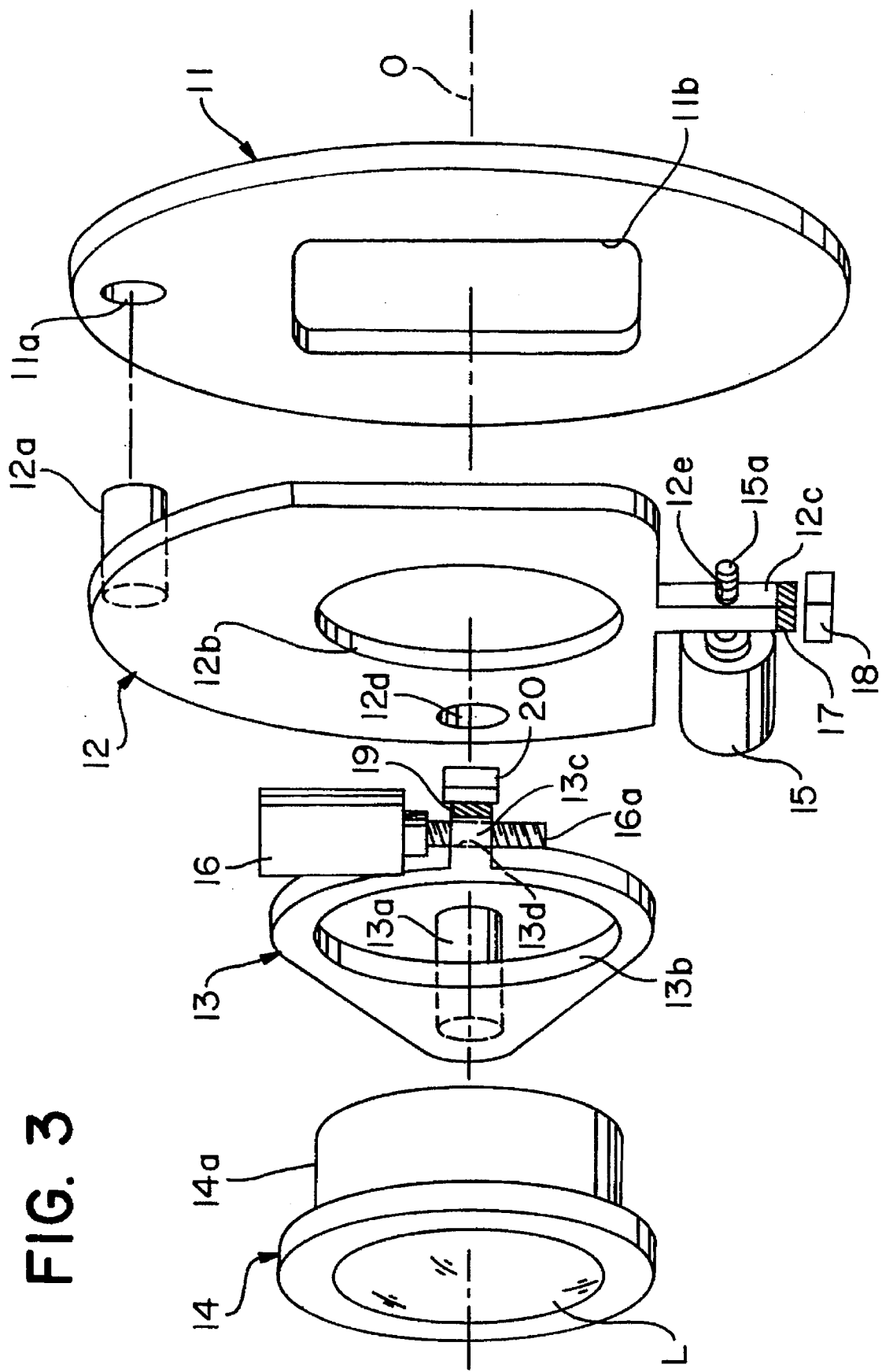
FIG. 3 is an exploded isometric view of the blur correcting lens driving apparatus shown in FIG. 2.

In FIGS. 2 and 3, "L" designates a blur correcting lens. This blur correcting lens L is driven to move in an opposite direction to the direction of the camera shake to prevent movement of the image on the film plane.

A supporting substrate 11 comprises a disk-shaped member which supports the blur correcting lens L. The supporting substrate 11 is provided with a first hole 11a and a center opening 11b whose center is located on an optical axis O of the picture taking lens 31. The first hole 11a is offset from the optical axis O outside the center opening 11b. The axis of the first hole 11a extends parallel to the optical axis O. The supporting substrate 11 is secured to an immovable part of the picture taking lens system 31, such as an outer lens barrel (not shown) of the picture taking lens 31, or a camera body of the camera.

A first rotary disk 12 has a first rotating shaft 12a which is provided in the vicinity of the outer peripheral edge thereof and rotatably fitted into the first hole 11a of the supporting substrate 11. Consequently, the first rotary disk 12 is rotatable about the axis of the first rotating shaft 12a within a plane perpendicular to the optical axis O. The first rotary disk 12 is provided with a circular opening 12b with a center which is substantially coaxial to the optical axis O, a driving arm 12c which is located on the side opposite to the rotating shaft 12a with respect to the optical axis O, and a second hole 12d.

A second hole 12d is formed in a manner such that the second hole 12d is placed on a straight line "b" and is offset from and parallel to the optical axis O when a straight line "a" is made coincident with a vertical direction. The straight line "a" is a line on which the first rotating shaft 12a (or the first hole 11a) and the driving arm 12c are located. The straight line "b" is a line which intersects the optical axis O and falls at right angles with the straight line "a" on the first rotary disk 12. The driving arm 12c is provided with a female screw 12e. The female screw 12e is formed in a manner such that the axis of the female screw 12e extends in a direction perpendicular to the straight line "a" when the first rotary disk 12 is in the state shown in FIG. 2, in which the first rotating shaft 12a and the driving arm 12c are located on the straight line "a".

A second rotary disk 13 has a second rotating shaft 13a which is provided in the vicinity of the outer peripheral edge thereof and rotatably fitted in the second hole 12d of the first rotary disk 12. Consequently, the second rotary disk 13 is rotatable about the axis of the second rotating shaft 13a within a plane perpendicular to the optical axis O. The second rotary disk 13 is provided with a center circular opening 13b with a center which is substantially coaxial to the optical axis O, and a driving arm 13c which is located on the side opposite to the second rotating shaft 13a with respect to the optical axis O.

The driving arm 13c is provided with a female screw 13e. This female screw 13e is formed in a manner such that the female screw 13e extends in a direction perpendicular to the straight line "b" when the second rotating shaft 13a and the driving arm 13c are located on the straight line "b". A blur correcting lens frame 14 supports a blur correcting lens L and has a barrel portion 14a whose center axis is coaxial to the optical axis O. The barrel portion 14a is fitted in and secured to the circular opening 13b. Namely, the blur correcting lens frame 14 is supported by the supporting substrate 11 through the second rotary disk 13 and the first rotary disk 12.

The barrel portion 14a is loosely fitted in the center opening 12b of the first rotary disk 12 and the center opening 11b of the supporting substrate 11, so that the blur correcting lens frame 14 is movable (rotatable) through a predetermined angular displacement about the axes of the second and first rotating shafts 13a and 12a. Namely, the inner diameter of the center opening 12b of the first rotary disk 12 is made slightly larger than the outer diameter of the barrel portion 14a so that the second rotary disk 13 can be rotated through a small angular displacement (e.g., a few millimeters) about the axis of the rotating shaft 13a (axis of the second hole 12d).

The supporting substrate 11 is provided thereon with a first driving motor 15 having a driving screw shaft 15a which is engaged with the female screw 12e of the driving arm 12c. The driving screw shaft 15a extends parallel to the straight line "a". The first rotary disk 12 is provided with a second driving motor 16 having a driving screw shaft 16a which is engaged with the female screw 13e of the driving arm 13c. The driving screw shaft 16a extends parallel to the straight line "b". With this structure, when the screw shafts 15a and 16a are rotated, the first and second rotary disks 12 and 13 can be rotated about the axes of the first rotating shaft 12a (first hole 11a) and the second rotating shaft 13a (second hole 12d), respectively.

Strictly speaking, when the rotation of the first or second rotary disks 12 and 13 takes place, the screw shafts 15a, 16a and the corresponding female screws 12e, 13e of the driving arms 12c and 13c are not exactly aligned. This is, however negligible when the angular displacement of the driving arms 12c and 13c is small with respect to the radius of rotational movement. On the other hand, if the angular displacements of the driving arms 12c and 13c are large, the motors 15 and 16 are preferably mounted to the rotary disks 12 and 13 through pivot shafts, or flexible joints (not shown), and are preferably provided between the drive shafts of the motors 15, 16 and the screw shafts 15a, 16a to absorb the angular displacements of the driving arms 12c and 13c, respectively.

As mentioned above, the blur correcting apparatus as constructed above is provided between the picture taking lens system 31 and a film or an image pickup element (not shown) which is located at an image forming position at which an image of an object to be taken is formed by the picture taking lens system. Furthermore, the blur correcting apparatus is placed, for example, in a manner such that the straight lines "a" and "b" are identical to the vertical and horizontal axes, respectively.

When the first driving motor 15 is actuated with an output which corresponds to the direction and magnitude of the horizontal component of the camera shake (movement of the optical axis of the taking lens) to rotate the first screw shaft 15a of the first driving motor 15, the first rotary disk 12 and accordingly, the blur correcting lens L are rotated about the axis of the first rotating shaft 12a through the driving arm 12c in a direction to cancel the horizontal component of the camera shake (blur). Since the second rotary disk 13 to which the blur correcting lens L is secured is supported on the first rotary disk 12, the blur correcting lens L is moved together with the first rotary disk 12 in the horizontal direction.

Similarly, when the second driving motor 16 is actuated with an output which corresponds to the direction and magnitude of the vertical component of the camera shake to rotate the second screw shaft 16a of the second driving motor 16, the second rotary disk 13 and accordingly, the blur correcting lens L are rotated about the axis of the second rotating shaft 13a through the driving arm 13c in a direction to cancel the vertical component of the camera shake (blur). The movement of the second rotary disk 13 (blur correcting lens L) occurs within the center opening 12b of the first rotary disk 12 without moving the first rotary disk 12.

The driving arms 12c and 13c are provided at the ends thereof with permanent magnets 17 and 19, respectively. An M.R. (i.e., magneto resistance) sensor 18 is fixed to the supporting substrate ii on the portion of the surface facing the permanent magnet 17. An M.R. sensor 20 similar to the M.R. sensor 18 is fixed to the first rotary disk 12 on the portion of the surface facing the permanent magnet 19. The M.R. sensors 18 and 20 vary their outputs in accordance with the positions of the permanent magnets 17, 19, and also the positions of their magnetic poles, respectively. When the blur correcting lens L is located at the center of a blur correctable range, the outputs of the M.R. sensors 18 and 20 become zero volt. The M.R. sensors 18, 20 and the permanent magnets 17, 19 constitute a position detecting device which detects the center of the blur correctable range of the blur correcting lens L and, also the deviation amount of the blur correcting lens L from the above center.

Figure 1:
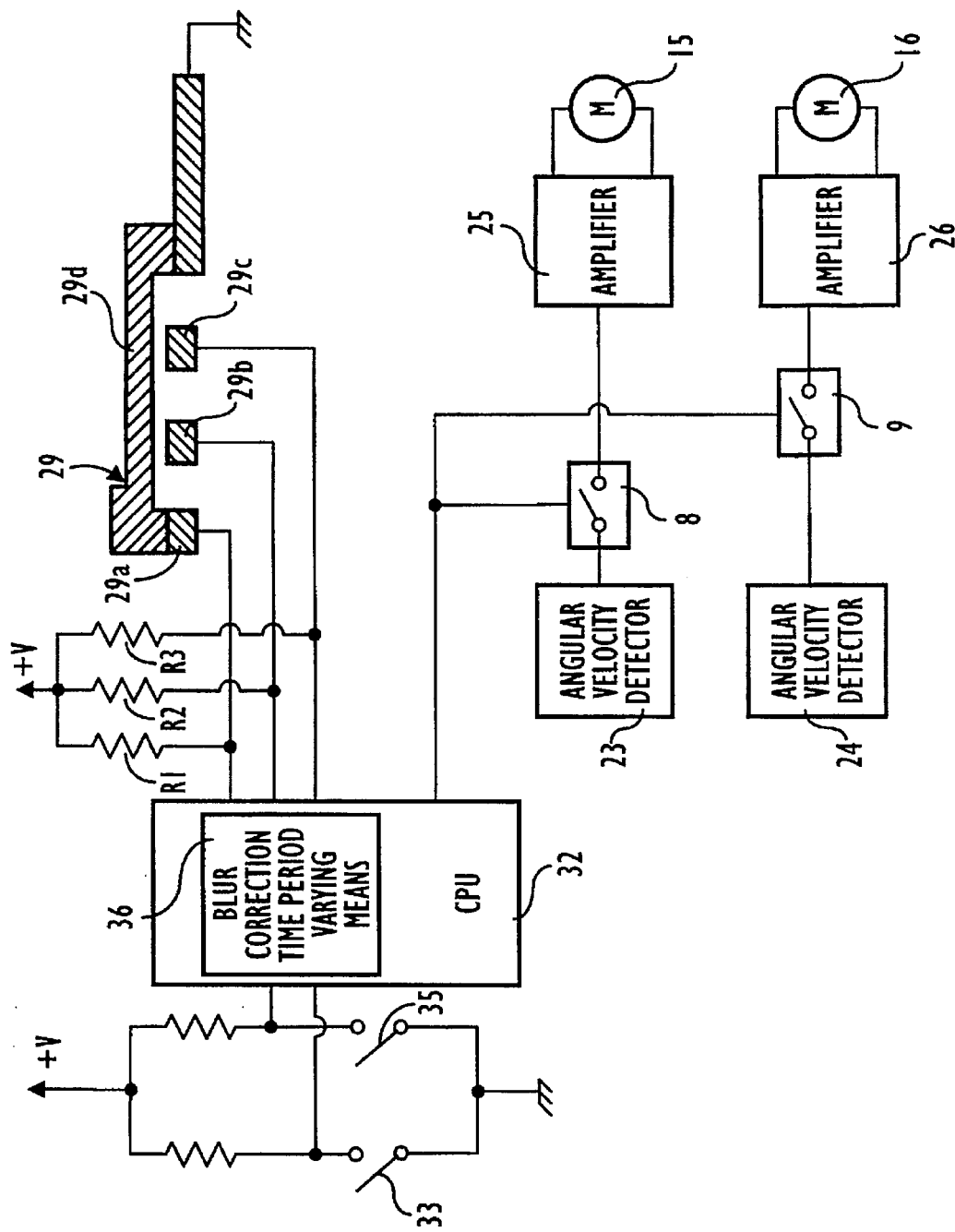
FIG. 1 is a block diagram of a blur correcting apparatus of a camera according to a first embodiment of the present invention.

The camera 10, which includes the blur correcting apparatus of the present invention, is provided with angular velocity detecting sensors 23 and 24 as shown in FIG. 1 which detect an angular velocity ω. The first and second driving motors 15 and 16 are controlled to move the blur correcting lens L in order to prevent an image on a film plane from blurring in accordance with the outputs of the angular velocity detecting sensors 23 and 24. A controlling system which controls the first and second driving motors 15 and 16 will be discussed below in detail in accordance with the block diagram shown in FIG. 1.

Numeral 32 designates a CPU which accomplishes the calculation and control for the actuation of a diaphragm, a film winding device, etc., and the control for the blur correcting operation. An input port of the CPU 32 is connected to a photometering switch 33 and a releasing switch 35. The photometering switch 33 and the releasing switch 35 are interlocked with a release button 27 of the camera 10, so that the photometering switch 33 is turned ON when the release button 27 is depressed half way and the release switch 35 is turned ON when the release button is fully depressed.

Figure 5:
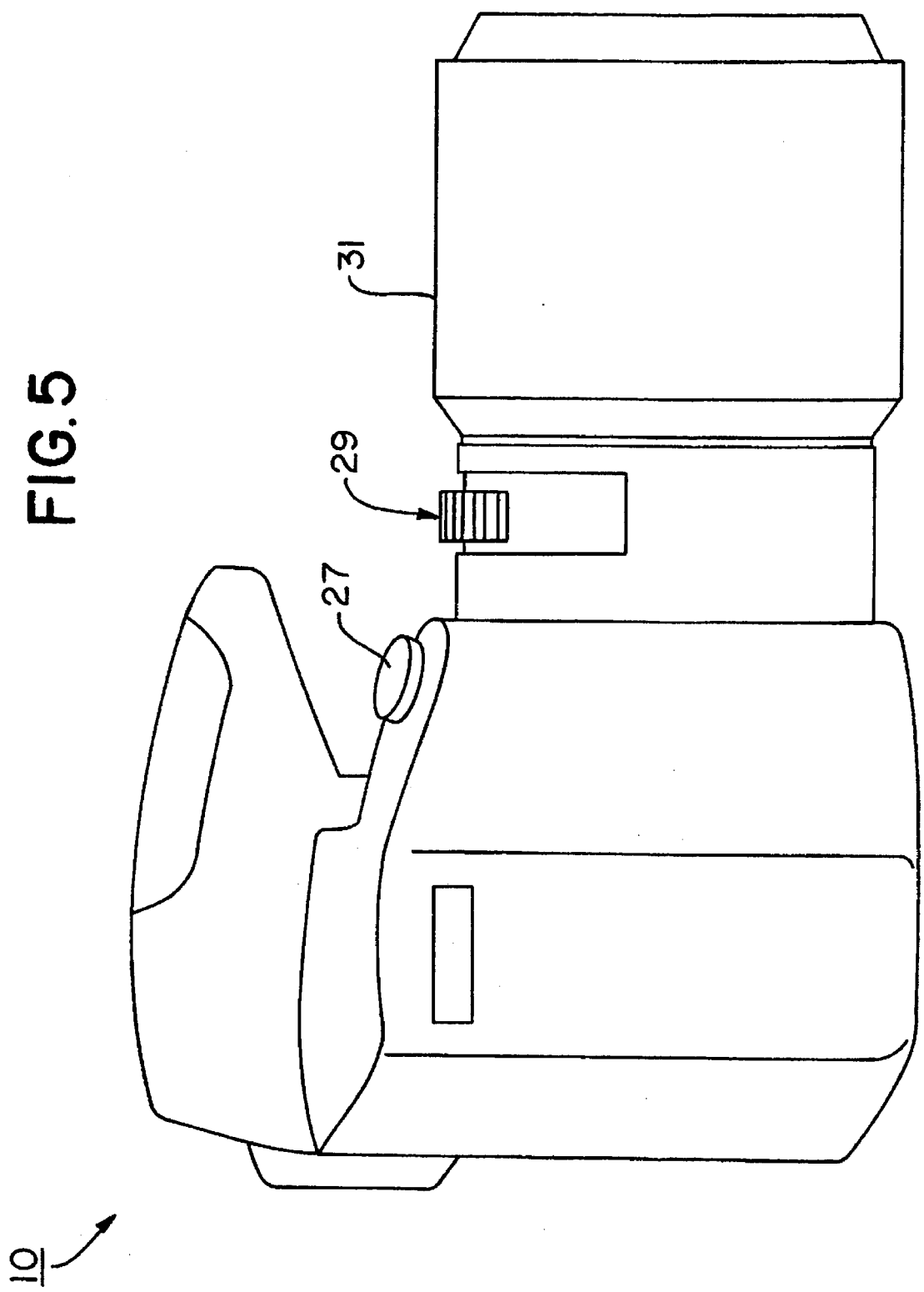
FIG. 5 is a side elevational view of a camera to which the blur correcting apparatus of the present invention is applied; and, FIG. 6 is a block diagram of a blur correcting apparatus of a camera according to a second embodiment of the present invention.

The input port of the CPU 32 is also connected to first, second, and third contacts 29a, 29b, and 29c of a selecting switch (i.e., selecting mechanism) 29 shown in FIG. 5. The selecting switch 29 changes the commence time and the finish time of the blur correcting control of the blur correcting apparatus. The first, second, and third contacts 29a, 29b, and 29c are connected to resistors $R_1$, $R_2$, and $R_3$, respectively. Thereby the CPU recognizes when contact 29a, 29b or 29c are in contact with sliding member 29d. The selecting switch 29 is provided with a sliding member 29d which is slidable using, for instance, a finger so as to selectively contact the first, second, and third contacts 29a, 29b, and 29c.

An output port of the CPU 32 is connected to a control terminal of a first analog switch 8 which is connected between angular velocity detecting sensor 23 and an amplifier 25 which is for driving the motor 15. The output port of the CPU 32 is also connected to a control terminal of a second analog switch 9 which is connected between the annular velocity detecting sensor 24 and an amplifier 26, which is for driving the motor 16. Amplifiers 25 and 26 are connected to the first and second driving motors 15 and 16, respectively. When the first analog switch 8 is turned ON, amplifier 25 actuates the motor 15 to be driven in accordance with an output from the angular velocity detecting sensor 23 that corresponds to the magnitude and direction of a camera shake in a horizontal direction of the camera body 10. Likewise, when second analog switch 9 is turned ON, amplifier 26 actuates motor 16 to be driven in accordance with an output from the angular velocity detecting sensor 24 that corresponds to the magnitude and direction of a camera shake in a vertical direction of the camera body 10.

The CPU 32 includes a blur correction time period varying mechanism 36. This varying mechanism 36 is provided with a 5 plurality of control parameters. These control parameters each have a start time and an finish time for the blur correcting operation of the blur correcting apparatus. The combination of the start time and finish time are different from those of the other control parameters. The varying mechanism 36 controls the first and second analog switches 8 and 9 to turn ON and OFF in accordance with a start time and an finish time for the control parameter which is selected out of the above plurality of control parameters by the selecting switch 29.

The above-noted plurality of control parameters include a first control parameter, a second control parameter, and a third control parameter. When the sliding member 29d is brought into contact with the first, second, and third contacts 29a, 29b, and 29c, the first, second, and third control parameters are selected by the varying mechanism 36, respectively.

The first control parameter, which is selected by the varying mechanism 36 when the sliding member 29d is brought into contact with the first contact 29a, has a start time which is set immediately before the time at which the shutter starts moving, that is, before the leading blades or a front curtain of the shutter starts moving. The first control parameter also has a finish time which is set to correspond to the time at which the shutter stops moving, that is, the trailing blades or a rear curtain of the shutter stops moving. In the case where a blur correcting control is accomplished with this first control parameter, a blur correction can be properly conducted though a photographer cannot visually check if a blur correcting control is in operation since the blur correcting control is done only during the exposure, that is, during a blackout at the view finder.

The above second control parameter, which is selected by the varying mechanism 36 when the sliding member 29d is brought into contact with the second contact 29b, has a start time which corresponds to the time at which the photometering switch 33 is turned ON, and a finish time which corresponds to the time at which the shutter stops moving: that is, the trailing blades or a rear curtain of the shutter stop moving. In the case that a blur correcting control is accomplished with this second control parameter, since the blur correcting control starts when the release button 27 is depressed half way down, a photographer can visually confirm that a blur correcting control is in operation by looking through the finder. Therefore, this second control parameter is effective when a photographer wants to confirm if a blur correcting control is in operation prior to taking a picture.

The above third control pattern, which is selected by the varying mechanism 36 when the sliding member 29d is brought into contact with the third contact 29c, has a start time which corresponds to the time at which the releasing switch 35 is turned ON, and an finish time which corresponds to the time at which the photometering switch 33 is turned OFF. In the case where a blur correcting control is conducted with this third control parameter, if a photographer holds the release button 27 at the half way down position to keep the photometering switch ON after fully depressing the release bottom 27, he can visually check that the blur correcting control is in operation through the view finder after the shutter has closed. Therefore, this third control pattern is effective when a photographer wants to confirm if a blur correcting control was in operation after taking a picture.

The operation of the blur correcting apparatus of the present invention having the above-noted structure will be explained below, along with a flow chart shown in FIG. 4.

When a main switch (not shown) of the camera 10 is turned ON, the control checks if the photometering switch 33 is turned ON at S1. When the photometering switch 33 is turned ON by the release button 27 being depressed half way, the control actuates the varying means 36 to output "1" to the output port of the CPU 32 to turn ON the analog switches 8 and 9 if the sliding member 29d comes into contact with the second contact 29b, thereby causing the output of the angular velocity detecting sensors 23 and 24 to be inputted to amplifiers 25 and 26, respectively, to start a blur correcting control, in which amplifiers 25 and 26 actuate the motor 15 and 16 to be driven by a certain rotational amount corresponding to the angular velocity and direction of a camera shake, in accordance with the second control parameter step S2 and Step S3. At Step S4, the control cause the CPU 32 to calculate an exposure value and an exposure time necessary for taking a picture, based on an object brightness obtained from a photometering mechanism (not shown) after the photometering switch 33 is turned ON.

Figure 4:
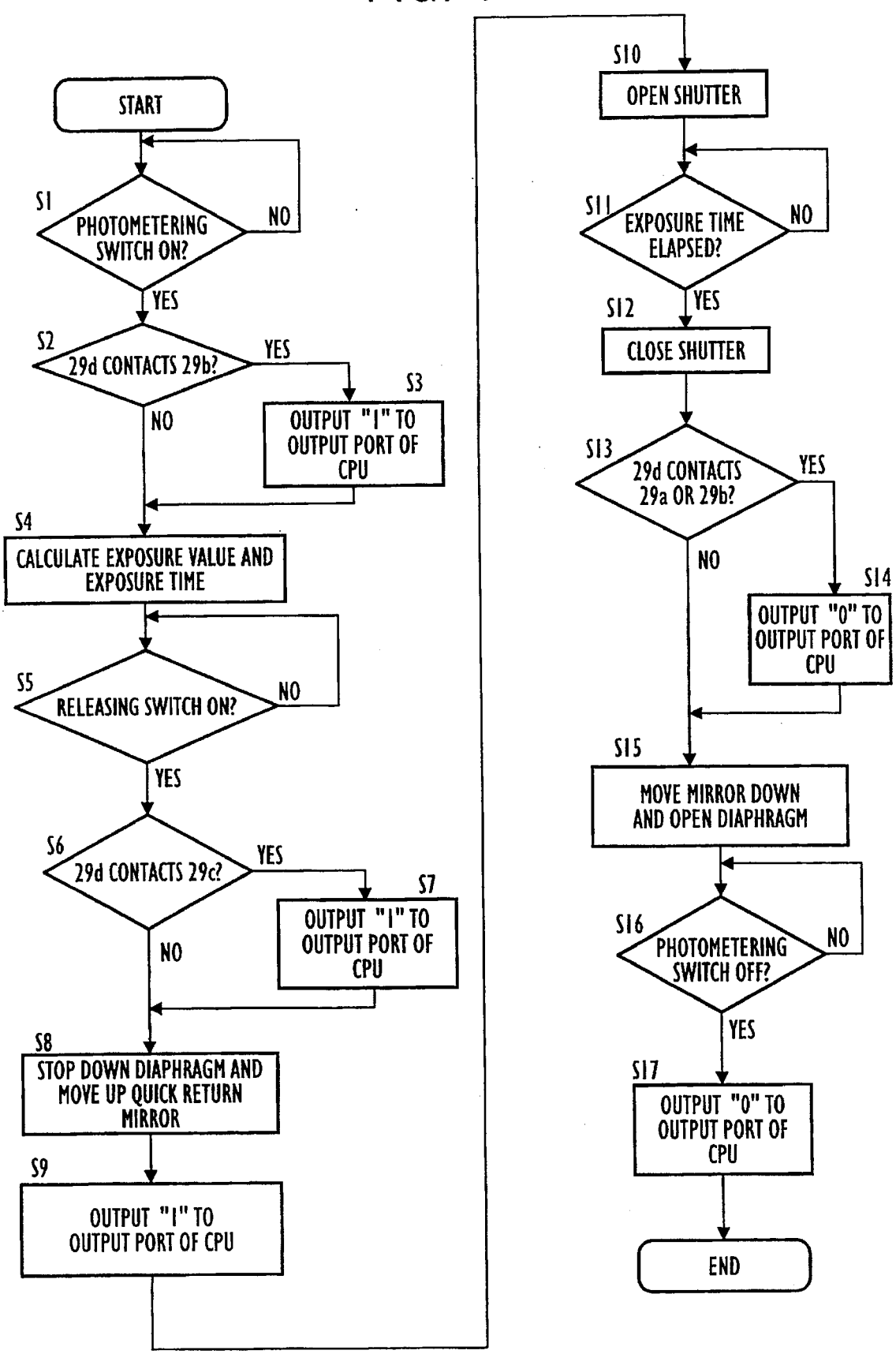
FIG. 4 is a flow chart showing a control of the blur correcting apparatus according to the first embodiment of the present invention.

Thereafter, when the release button 27 is further depressed down to turn ON the releasing switch 35, the control actuates the varying mechanism 36 to output "1" to the output port of the CPU 32 to turn ON the analog switch 8 and 9 if the sliding member 29d comes into contact with the third contact 29c, thereby causing the outputs of the angular velocity detecting sensors 23 and 24 to be inputted to amplifiers 25 and 26, respectively, to start a blur correcting control in which amplifiers 25 and 26 actuate the motor 15 and 16 to be driven by a certain rotational amount corresponding to the angular velocity and direction of a camera shake, in accordance with the third control pattern (Steps S5, S6, S7 of FIG. 4).

Thereafter, the control cause a quick return mirror (not shown) of the camera 10 to close a diaphragm (not shown) of the camera 10. After the actions of the quick return mirror and diaphragm have been completed, the control actuates the varying mechanism 36 to output "1" to the output port of the CPU 32, regardless of the selection of the selecting switch 29 (Step S8 and Step S9). Based on the above "1" outputted by the varying means 36, the analog switches 8 and 9 are turned ON. Then the outputs of the angular velocity detecting sensors 23 and 24 are inputted to the amplifier 25 and 26, respectively, thereby causing a blur correcting control to be commenced immediately before the shutter starts moving. That is, before the leading blades or the front curtain of the shutter starts moving. For the cases where Step S3=1 or Step S7=1, that is, sliding contact 29d comes into contact with 29b or 29e, then the blur correcting control has already been started.

Thereafter, the control has the leading blades of the shutter start moving at Step S10, and then, the control has the trailing blades of the shutter complete the movement thereof when the exposure time calculated at Step S4 has finished, thereby causing the photograph taking to be completed Step (S11, S12). Thereafter, in the case where the sliding member 29d is in contact with the first or second contact 29a or 29b, the control actuates the varying mechanism 36 to output "0" to the output port of the CPU 32 to stop the first and second motor 15 and 16, thereby causing the blur correcting control to be completed Step (S13, S14).

In the case where the sliding member 29d is in contact with the third contact 29c, the control does not actuate the varying mechanism 36 to output "0" to the output port of the CPU 32, but instead keeps the first and second motors 15 and 16 moving, i.e., continues the blur correcting control.

Thereafter, when the photometering switch 33 is turned OFF after the quick return mirror and the diaphragm are recovered, the control actuates the varying means 36 to output "0" to the output port of the CPU 32, regardless of the selection of the selecting switch 29, to stop the first and second motors 15 and 16, thereby completing one photographing operation (Step S15~S17). As can be seen from the foregoing, according to the blur correcting apparatus to which the present invention is applied, since a starting time and a finish time of the blur correcting control can be selected from a pre-set plurality of control parameters by a photographer, the blur correcting apparatus of the present invention can fully satisfy the demands of a photographer when photographing with a blur correcting system.

In the above first embodiment, the blur correction period varying mechanism 36 may be provided with another control parameter, i.e., a fourth control parameter. This fourth control parameter has a start time which is set to correspond to the time at which the photometering switch 33 is turned ON, and a finish time which corresponds to the time at which the photometering switch 33 is turned OFF. In the case where a blur correcting control is conducted by this fourth control parameter, a photographer can see, through a viewfinder, the blur correcting control in operation before and after an exposure of the camera 10.

Figure 6:
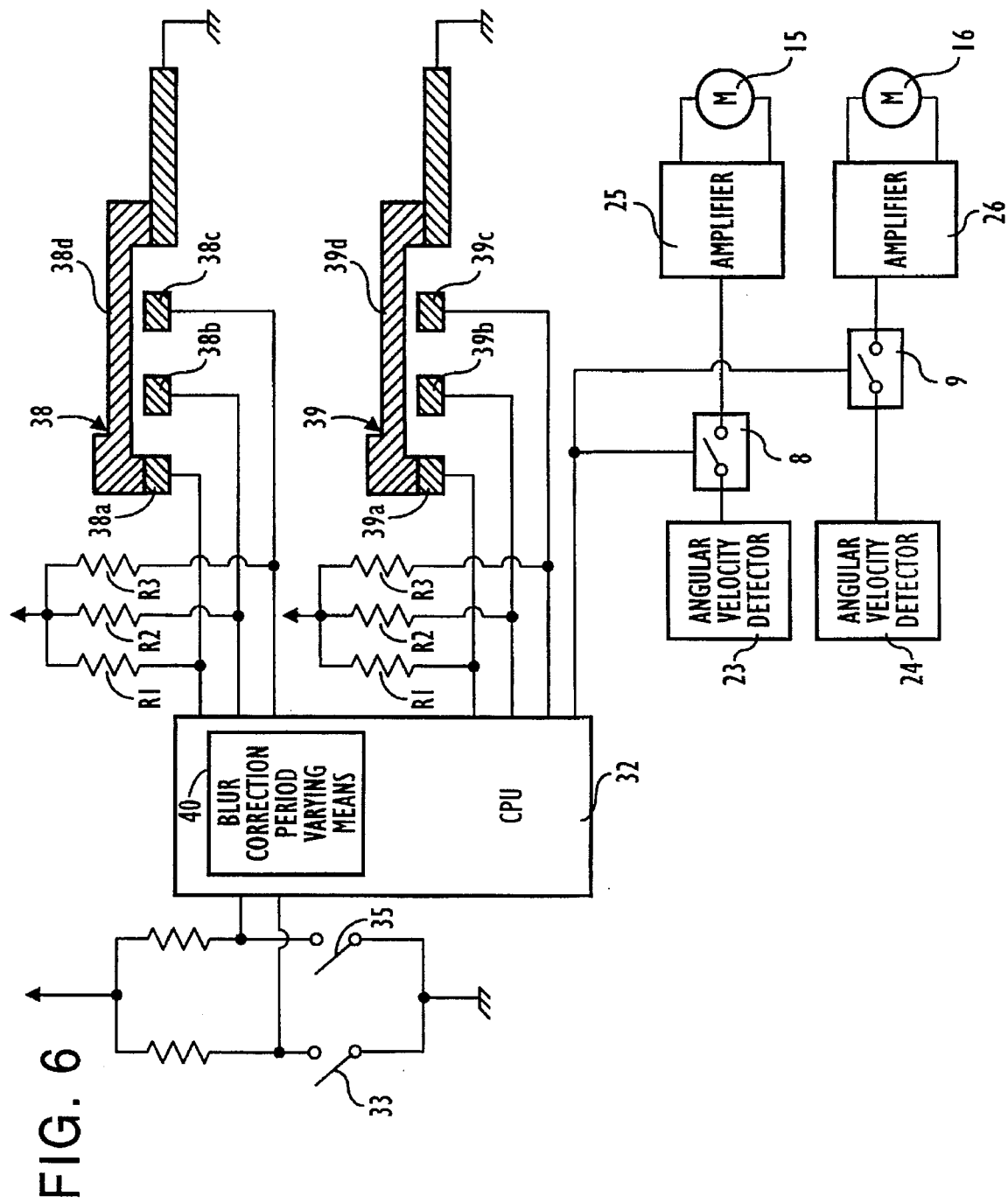

FIG. 6 shows another controlling system which controls the first and second driving motors 15 and 16, according to a second embodiment of the present invention. In FIG. 6 the same mechanism or members as those in FIG. 1 are designated by the same numerals. In this controlling system of the second embodiment, first and second selecting switches 38 and 39 are each provided with a similar structure to the selecting switch 29 of the first embodiment. The first and second selecting switches 38 and 39 are for selecting a start time and a finish time of the blur correcting control, respectively. The CPU 32 in the second embodiment is provided with a blur correction period varying means 40. The blur correction period varying mechanism 40 is provided with a plurality of start times and a plurality of ending times. The blur correction period varying mechanism 40 controls first and second analog switches 8 and 9 to turn ON and OFF, in accordance with a start time and a finish time which are selected out of the above plurality of start times and finish times by the first and second selecting switches 38 and 39, respectively.

The selecting switches 38 and 39 are provided with sliding members 38d and 39d, respectively. In the case when the sliding member 38d is brought into contact with a first contact 38a of the selecting switch 38, the start time of the blur correcting control is set immediately before the time at which the shutter starts moving. In the case where the sliding member 38d is brought into contact with a second contact 38b, the start time is set to correspond to the time at which the photometering switch 33 is turned ON. In the case where the sliding member 38d is brought into contact with a third contact 38c, the start time is set to correspond to the time at which the releasing switch 35 is turned ON. When the sliding member 39d is brought into contact with a first contact 39a or a second contact 39b of the second selecting switch 39, the finish time of the blur correcting control is set to correspond to the time at which the shutter stops moving. In the case when the sliding member 39d is brought into contact with a third contact 39c, the finish time is set to correspond to the time at which the photometering switch 33 is turned OFF.

According to the blur correcting apparatus of the second embodiment, the combination of the start time and finish time of the blur correcting control can be freely varied by a photographer.

Although the angular velocity detecting sensors 23 and 24 are used as blur detecting means in the first and second embodiments, angular acceleration detecting sensors may be used instead of the angular velocity detecting sensors 23 and 24 as blur detecting means.

As can be seen from the foregoing, according to the present invention, since the time a blur correcting control is in operation with respect to the exposure time can be selectively varied by a photographer, it is possible for an SLR camera provided with the blur correcting apparatus of the present invention to be set in a manner such that it is possible for the photographer to see a blur correcting operation through a viewfinder. Furthermore, the blur correcting control which is set to correspond to his or her photographic technique or taste can be realized.

I claim:

1. A blur correction apparatus of camera, comprising:

a photographing optical axis system having a plurality of shutter blades;

a blur correction optical system, positioned coaxially with respect to an optical axis of said photographing optical system, and movable in a plane normal to the optical axis;

means for moving said blur correction optical system to keep an optical image, formed on a focal plane, stationary with respect to said focal plane; and means for manually selecting an activation and deactivation condition of said means for moving, said deactivation condition being one of a termination of movement of a trailing blade of said plurality of shutter blades and a photometering switch being turned off, whereby a user can confirm operation of said means for moving at least after an exposure sequence when said deactivation condition is said photometering switch being turned off.

2. The blur correction apparatus of claim 1, wherein said blur correction optical system is positioned between said photographing optical system and said focal plane.

3. The blur correction apparatus of claim 1, wherein said moving means comprises two motors having output shafts extending substantially perpendicular to each other.

4. The blur correction apparatus of claim 1, wherein said selecting means comprises a manually-operable switch.

5. The blur correction apparatus of claim 1, wherein said selecting means comprises two manually-operable switches, one of said two manually-operable switches selecting said activation condition, and the other of said two manually-operable switches selecting said deactivation condition of said plurality of deactivating conditions.

6. The blur correction apparatus of claim 1, wherein said camera comprises an SLR camera.

7. A blur correction apparatus of a camera, comprising:

a photographing optical system having a plurality of shutter blades;

a blur correction optical system, positioned coaxially with respect to an optical axis of said photographing system, and movable in a plane normal to the optical axis;

means for moving said blur correction optical system to keep an optical image, formed on a focal plane, stationary with respect to said focal plane;

means for activating said means for moving responsive to a first condition, said first condition being one of a commencement of movement of a leading one of said plurality of shutter blades and a time prior to said commencement;

means for deactivating said means for moving responsive to a second condition, said second condition being one of a termination of movement of a trailing blade of said plurality of shutter blades and a time after said termination of said movement; and means for manually selecting said first and second conditions, whereby a user can confirm operation of said means for moving at least after an exposure sequence when said second condition is said time after termination of said movement.

8. The blur correction apparatus of claim 7, wherein said blur correction optical system is positioned between said photograph and optical system and said focal plane.

9. The blur correction apparatus of claim 7, wherein said means for moving includes first and second motors having substantially perpendicular shafts.

10. The blur correction apparatus of claim 7, wherein said first condition further comprises a photometering switch being activated, and said second condition further comprises said photometering switch being deactivated.

11. A blur correction apparatus of a camera, comprising:

a photographing optical system having a plurality of shutter blades;

a blur correction optical system, positioned coaxially with respect to an optical axis of said photographing optical system, and movable in a plane normal to the optical axis;

means for moving said blur correction optical system to keep an optical image, formed on a focal plane, stationary with respect to said focal plane;

said means for moving having at least first, second and third selectable modes of operation;

said first mode of operation comprising activating said means for moving at a time prior to a commencement of movement of a leading one of said plurality of shutter blades, and deactivating said means for moving responsive to a termination of movement of a trailing blade of said plurality of shutter blades;

said second mode of operation comprising activating said means for moving responsive to a photometering switch being activated, and deactivating said means for moving responsive to a termination of movement of a trailing blade of said plurality of shutter blades, whereby a user can confirm operation of blur correction at least prior to movement of said plurality of shutter blades; and said third mode of operation comprising activating said means for moving responsive to a release switch being activated, and deactivating said means for moving responsive to said photometering switch being deactivated, whereby a user can confirm operation of blur correction at least following exposure.

12. The blur correction apparatus of claim 11, wherein said plurality of modes includes a fourth mode of operation which activates and deactivates said means for moving responsive to said photometering switch being activated and deactivated, respectively, whereby a user can confirm operation of blur correction following exposure.

* * * * *